(12) United States Patent
Smirra

(10) Patent No.: US 7,401,792 B2
(45) Date of Patent: Jul. 22, 2008

(54) SEALING DEVICE AND METHOD FOR ASSEMBLING THE SEALING DEVICE

(75) Inventor: Karl Smirra, Wasserburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/685,852

(22) Filed: Oct. 15, 2003

(65) Prior Publication Data

US 2004/0113368 A1 Jun. 17, 2004

(30) Foreign Application Priority Data

Oct. 16, 2002 (DE) ................ 102 48 215

(51) Int. Cl.
*F16L 5/02* (2006.01)
*H02G 15/013* (2006.01)
*H02G 15/02* (2006.01)

(52) U.S. Cl. .............. 277/616; 277/607; 277/619; 277/622; 277/624; 277/641; 174/77 R; 174/79; 16/2.4; 285/148.27; 403/202

(58) Field of Classification Search .......... 277/607, 277/616, 619, 622, 624, 641, 580; 285/148.27; 174/50.54, 65 R, 77 R, 79; 403/202, 203; 16/2.1–2.5
See application file for complete search history.

(56) References Cited

U.S. PATENT DOCUMENTS

| 1,235,926 | A | * | 8/1917 | Roux | 174/17 CT |
|---|---|---|---|---|---|
| 1,717,389 | A | * | 6/1929 | Kipnis | 285/207 |
| 1,842,216 | A | * | 1/1932 | Thomas, Jr. | 174/65 R |
| 2,126,703 | A | * | 8/1938 | Schmidt | 403/203 |
| 2,348,939 | A | * | 5/1944 | Thompson | 277/580 |
| 3,075,792 | A | * | 1/1963 | Franck | 285/148.27 |
| 3,148,900 | A | * | 9/1964 | Larson | 285/137.11 |
| 3,181,899 | A | * | 5/1965 | McKnight, Jr. | 285/139.2 |
| 3,899,200 | A | * | 8/1975 | Gamble | 285/93 |
| 4,198,537 | A | * | 4/1980 | Mariani | 174/65 R |
| 4,382,618 | A | * | 5/1983 | Grisebach | 285/124.4 |
| 4,474,379 | A | * | 10/1984 | Holzer | 277/423 |
| 4,494,759 | A | * | 1/1985 | Kieffer | 277/367 |
| 4,613,169 | A | * | 9/1986 | Engelhart | 285/139.2 |
| 4,889,349 | A | * | 12/1989 | Muller | 277/556 |
| 4,947,811 | A | * | 8/1990 | Binford | 123/188.6 |
| 5,190,408 | A | * | 3/1993 | Ozeki et al. | 405/154.1 |
| 5,607,323 | A | * | 3/1997 | Foster et al. | 439/557 |
| 5,691,506 | A | * | 11/1997 | Miyazaki et al. | 174/65 R |
| 6,367,810 | B1 | * | 4/2002 | Hatch | 277/551 |
| 6,444,907 | B1 | * | 9/2002 | Kiely | 174/65 R |
| 6,682,355 | B1 | * | 1/2004 | Gretz | 439/98 |
| 6,709,280 | B1 | * | 3/2004 | Gretz | 439/92 |
| 6,780,029 | B1 | * | 8/2004 | Gretz | 439/92 |

* cited by examiner

*Primary Examiner*—Alison K Pickard
(74) *Attorney, Agent, or Firm*—Baker Botts L.L.P.

(57) ABSTRACT

To provide a seal for a conducting element (3) which is positioned eccentrically in a through-hole (2) in a housing wall (1), a proposal is made for a sealing body (8) which can be moved in a radial direction (11) and which can be fixed after assembly of the conducting element (3) by means of a clamping device (19).

9 Claims, 2 Drawing Sheets

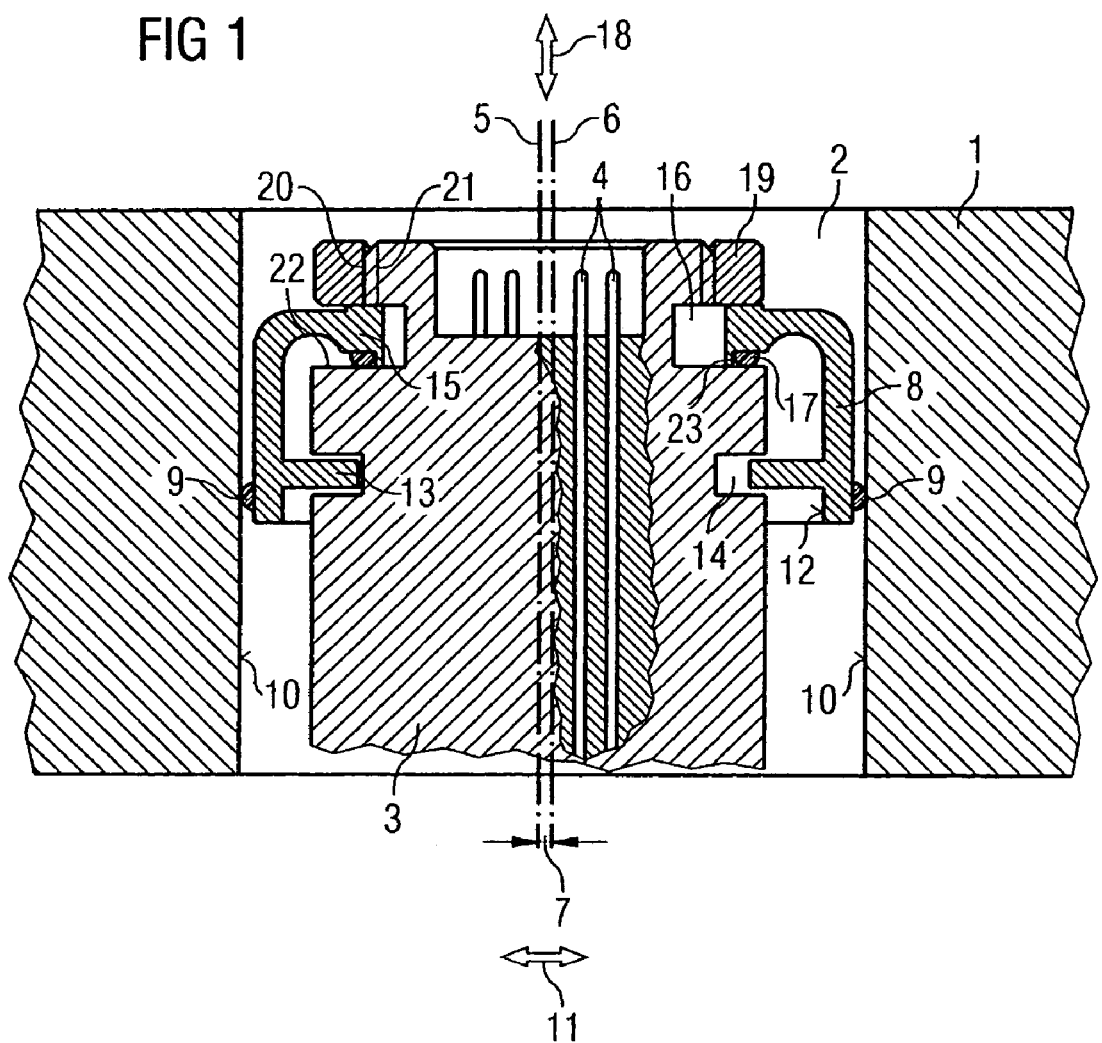

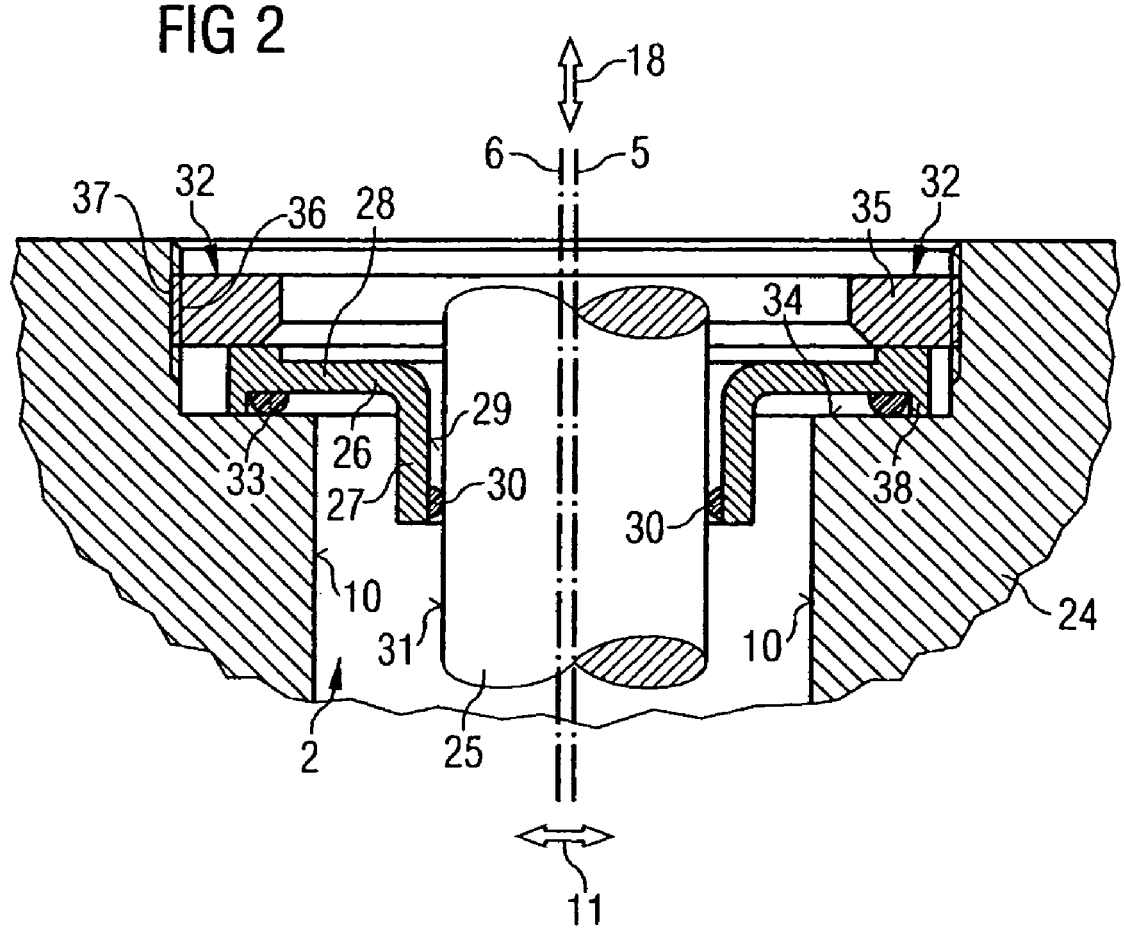

SEALING DEVICE AND METHOD FOR ASSEMBLING THE SEALING DEVICE

PRIORITY

This application claims foreign priority of the German application DE 10248215.2 filed on Oct. 16, 2002.

TECHNICAL FIELD OF THE INVENTION

The invention relates to a sealing device which has a conducting element which can be inserted off-center in a through-hole in a housing wall, and which has a sealing body touching both the conducting element and the housing wall.

BACKGROUND OF THE INVENTION

Sealing devices of this type are used in particular to effect an oil-tight seal on the through-hole for a connector in the wall of a gearbox housing. Because the connectors which pass through the wall of the gearbox housing have fixed connections to electronic circuits on the inside of the housing, the longitudinal axis of the connector does not always coincide with the longitudinal axis of the through-hole. The familiar way of sealing the through-hole in spite of this eccentricity is to provide a very large and soft circumferential seal around the connector, which can largely accommodate the eccentricity between the connector and the housing.

A disadvantage of this familiar sealing device is the unequal distribution of the sealing force around its perimeter, between the connector and the housing. Furthermore, very high total forces are required to ensure an adequate seal.

For this reason, connectors have been developed which can be mounted concentrically in the through-hole. However, these require an expensive mechanical compensation mechanism in the mechanical connector system.

SUMMARY OF THE INVENTION

Starting from this state of the art position, the object underlying the invention is to devise a simply-constructed sealing device with which it is possible to effect a homogeneous seal on eccentric through-holes for a conducting element. A further object underlying the invention is to devise a method of assembling the sealing device.

These objects can be achieved by a sealing device comprising a conducting element which can be inserted off-center in a through-hole in a housing wall, and which has a sealing body touching both the conducting element and the housing wall, wherein in the region where the sealing body contacts the conducting element and the housing wall, the cross-sectional profile of the housing wall and the conducting element has at least one recess within which the sealing body can be moved in a radial direction.

The objects can also be achieved by a method for sealing comprising the step of:
using a sealing device comprising a conducting element which can be inserted off-center in a through-hole in a housing wall, and which has a sealing body touching both the conducting element and the housing wall, wherein in the region where the sealing body contacts the conducting element and the housing wall, the cross-sectional profile of the housing wall and the conducting element has at least one recess within which the sealing body can be moved in a radial direction, to seal an eccentric through-hole for a conducting element, through the housing wall of a gearbox.

The sealing body may have one axial seal located in the recess and a further radial seal which mates with a surface which bounds the space between the connector body and the housing wall. The sealing body can be fixed by means of a clamping device which applies a force to the sealing body in the axial direction. The recess can be formed in the conducting element. A sealing ring with an internal thread can be screwed onto the conducting element to fix the sealing body. The recess can also be formed in the housing wall. The sealing body can then be fixed by means of an adjusting ring with an external thread. An end stop can be formed on the sealing body in a position which lies within the recess. The sealing body is attached to the conducting element by means of a positive retainer.

The objects can further be achieved by a method for assembling a sealing device, in which a conducting element and a sealing body are used in a through-hole in a housing wall, wherein the sealing body is first located in the radial direction in at least one recess provided in the contact area in the cross-sectional profile of the housing wall and the conducting element, and is then subject to a force which acts in the axial direction by means of a clamping device which acts on the sealing body in an axial direction.

The sealing body can be located in a radial direction in a recess formed in the conducting element, and can be subject to a force which acts in an axial direction applied by an adjusting nut which can be screwed onto the conducting element. The sealing body can also be located in a radial direction in a recess formed in the housing wall and can be subject to a force which acts in an axial direction applied by an adjusting ring which can be screwed into the recess.

With the sealing device, the cross-sectional profile of the housing wall and the conducting element are shaped in such a way that in the area where they touch the sealing body there is at least one recess within which the seal can be moved in a radial direction. With this sealing device, the radial position of the sealing body can be adjusted to the position of the conducting element concerned, and hence the position of the sealing body can be chosen in every case so that the seal is effected with a uniform radial contact force. Consequently, it is only necessary to ensure that the cross-sectional profile of the housing wall and the conducting element have recesses which permit movement of the sealing element in the radial direction. Additional mechanisms, by which for example with the current state of the art the conducting element is aligned with the axis of rotation of the through-hole, are not necessary.

In a preferred form of embodiment, sealing elements are provided on the sealing body to work in an axial direction in the recess, while the sealing elements of the sealing body which effect a seal in the radial direction are provided in the space between the conducting element and the housing wall. This form of embodiment offers the advantage that the sealing body can be fixed by means of a clamping device which applies a force to the sealing body in an axial direction.

The recesses provided to allow movement of the sealing body can be either in the conducting element or in the housing wall. In a preferred form of embodiment, the recess required for movement of the sealing body is formed in the conducting element. The clamping device is a clamping ring, with an internal thread, which can be screwed down onto the sealing body to affix it. In this exemplary form of embodiment, no special tools are required to assemble the clamping ring.

In a derived form of embodiment, the recess to accommodate the radial movement of the sealing body is provided in the housing wall. In this case, a clamping ring with an external thread can be screwed down onto the sealing body to affix it.

It is expedient if the assembly of the sealing device is effected by first inserting the conducting element and the sealing body into the through-hole. The sealing body is then aligned to correspond with the position of the conducting element in relation to the through-hole, and is fixed by means of the clamping device. This produces a sealing device which is oil-tight and which is also capable of accommodating mechanical loads, due for example to vibration.

BRIEF DESCRIPTION OF THE DRAWINGS

The invention is explained below by reference to the examples in the attached drawings. These show:

FIG. 1 a cross-section through a first form of embodiment of the sealing device; and FIG. 2 a cross-section through a second form of embodiment of the sealing device.

DETAILED DESCRIPTION OF THE PREFERRED EMBODIMENTS

FIG. 1 shows a housing wall 1 with a through-hole 2. A connector body 3 which has contacts 4 has been inserted into the through-hole 2. The connector body 3 can take the form of any required conducting element which is provided to transmit signals. Because the connector body 3 is connected to an electronic component on the inside of the housing wall 1, it is not always possible to make the longitudinal axis 5 of the connector body 3 coincide with the longitudinal axis 6 of the through-hole 2. Rather, an offset 7 arises, and this must be compensated by means of a sealing cuff 8. The sealing cuff 8 has a sealing lip 9 around its outer circumference, which presses against the inner side 10 of the through-hole 2, and which seals off the through-hole 2 in the radial direction 11. The sealing cuff 8 is positioned concentrically with the through-hole 2. The material properties of the sealing cuff 8 are chosen so that in the region of the sealing lip 9 they create a radial sealing effect against the housing wall 1.

Engagement ribs 13 are provided on the inner side 12 of the sealing cuff 8, and these engage in the recesses 14 in the connector body 3. The radial depth of the engagement ribs 13 and the dimensions of the recesses 14 are chosen so that the sealing cuff 8 is held by the connector body 3 during assembly. In particular, one of the engagement ribs 13 will still project into its associated recess 14 even when a diametrically opposite engagement rib 13 is inserted into the recess 14 up to its limit. The engagement ribs 13 thus serve as a positive retainer.

The sealing cuff 8 also has a base collar 15, which engages into a circumferential seal groove 16 in the connector body 3. In a derived form of embodiment, the seal groove 16 can also be replaced by a shoulder which is open in the upward direction. The base collar 15 of the sealing cuff 8 is provided with another sealing lip 17, which effects a seal in the axial direction 18. The base collar 15 of the sealing cuff 8 can be affixed using an adjusting nut 19, which applies an inward force on the sealing collar 15 in the axial direction 18. To this end, the adjusting nut 19 has an internal thread 20, which works in conjunction with an external thread 21 on the connector body 3. The axial sealing function is effected by the axial force applied by the adjusting nut 19, by which the base collar 15 is pressed against a mating surface 22 in the seal groove 16. This axial force can also be applied by a suitable bayonet fastener or some other suitable adjusting arrangement.

Because the connector body 3 can move within the sealing cuff 8, any eccentricity of the two parts can be accommodated without stress. The axial seal by the sealing lip 17 only becomes effective when the adjusting nut 19 is tightened up from the outer side of the housing wall 1. The sealing cuff 8 and the connector body 3 are then rigidly joined together via the sealing lip 17. Any destructive compression of the axial sealing lip 17 can be prevented by a limiting stop 23 on the sealing cuff. Depending on the compression force applied by the adjusting nut 19 it is even possible that the connector body 3 subsequently remains free to move at any time relative to the sealing cuff 8. This will be sensible in situations where thermal expansion or vibrations are to be accommodated.

FIG. 2 shows another exemplary form of embodiment of the sealing device. With this sealing device, the through-hole 2 is formed in a housing wall 24, and a connector body 25 extends through the through-hole 2. Inside the connector body 25 there can be contact structures, which are not shown in FIG. 2.

With the exemplary form of embodiment shown in FIG. 2, the through-hole 2 is sealed by a sealing collar 26, comprising a sealing sleeve 27 which extends along the connector body 25 and a sealing disk 28 which spreads radially outwards. On the inner side 29 of the sealing sleeve 27 there is a sealing lip 30 which runs around the connector body 25, which touches the outer side 31 of the connector body 25.

On the outer side of the housing wall 24 there are recesses 32 into which the sealing disk 28 of the sealing collar 26 extends. A sealing lip 33 which is formed on the sealing disk 28, which presses against a mating surface 34 in the recess 32, seals off the through-hole 2 in the axial direction 18. Here, the sealing lip 33 is subject to a force which works in the axial direction, applied by an adjusting ring 35. This adjusting ring 35 has an external thread 36, which engages in an internal thread 37 in the recess 32. Any destructive compression of the sealing lip 33 can be prevented by a limiting stop 38.

The sealing lips 9, 17, 30 and 33 can be seal inserts or could also be molded on or dispensed seals. Or the sealing cuff 8 or sealing collar 26 itself could also consist of a suitable sealing material, for example hard rubber, so that it effects all the sealing functions. In this situation, care must be take that the sealing cuff 8 and the sealing collar 26 apply the necessary contact force to create the radial sealing effect.

Using the sealing devices described here, it is possible to effect a uniform seal for eccentric connector through-holes. In this case, the fixing of the connector body 3 or 25 to the electronic components does not need to allow movement. Consequently, the design of the connector body 3 or 25 can be kept simple.

Even under operational conditions, the connector body 3 or 25 remains moveable relative to the sealing cuff 8 or sealing collar 26. This allows vibrations or thermal expansions to be accommodated without the sealing device developing leaks.

The exemplary form of embodiment of the sealing device shown in FIG. 1 can be installed either from the inner side of the housing wall 1 or from the outer side of the housing wall 1. If the engagement ribs 13 are omitted, it is also possible to assemble the sealing cuff 8 after the connector body 3 has been inserted into the through-hole 2.

The invention claimed is:

1. A sealing device comprising:
a conducting element which can be inserted off-center in a through-hole having an inner side wall, said sealing device having a sealing body touching both the conducting element and the inner side wall;
wherein in the region where the sealing body contacts the conducting element and the inner side wall, the cross-sectional profile of the conducting element has at least one first recess within which the sealing body can be moved in a radial direction;

wherein the sealing body is attached to the conducting element by a positive retainer comprising: at least one engagement rib provided on the sealing body and at least one second recess in the conducting element, further comprising a sealing ring with an internal thread screwed onto the conducting element to fix the sealing body with respect to the inner side wall.

2. A sealing device in accordance with claim 1, wherein the sealing body has one axial seal located in the at least one first recess and a further radial seal which mates with a surface which bounds the space between the connector body and the inner side wall.

3. A sealing device in accordance with claim 1, wherein the sealing body is operable to be fixed by means of a clamping device which applies a force to the sealing body in the axial direction.

4. A method for sealing comprising the steps of:
using a sealing device comprising a conducting element which can be inserted off-center in a through-hole having an inner side wall, and which has a sealing body touching both the conducting element and the inner side wall;
wherein in the region where the sealing body contacts the conducting element and the inner side wall, the cross-sectional profile of the housing wall and the conducting element has at least one first recess within which the sealing body can be moved in a radial direction, to seal an eccentric through-hole for the conducting element; and
attaching the sealing body to the conducting element by means of a positive retainer comprising: at least one engagement rib provided on the sealing body and at least one second recess in the conductor element, further comprising the step of:
screwing a sealing ring with an internal thread onto the conducting element which comprises the at least one first recess to fix the sealing body.

5. A method in accordance with claim 4, further comprising the step of fixing the sealing body with a clamping device that applies a force to the sealing body in the axial direction.

6. A method in accordance with claim 4, further comprising:
positioning an axial seal in the at least one first recess; and
positioning a further radial seal so as to engage a surface which bounds the space between the connector body and the housing wall.

7. A sealing device comprising:
a conducting element which can be inserted off-center in a through-hole in a housing wall, said sealing device having a sealing body touching both the conducting element and the housing wall;
wherein in the region where the sealing body contacts the conducting element and the housing wall, the cross-sectional profile of the conducting element has at least one recess within which the sealing body can be moved in a radial direction;
wherein the sealing body has one axial seal located in the recess and a further radial seal which mates with a surface which bounds the space between the connector body and the housing wall;
wherein a limiting stop is formed on the sealing body in a position which lies within the recess, wherein the limiting stop limits compression of the axial seal.

8. A sealing device in accordance with claim 7, wherein the sealing body is operable to be fixed by means of a clamping device which applies a force to the sealing body in the axial direction.

9. A sealing device in accordance with claim 7, further comprising a sealing ring with an internal thread screwed onto the conducting element to fix the sealing body with respect to the housing wall.

* * * * *